United States Patent
Wakatsuki et al.

(10) Patent No.: US 12,100,561 B2
(45) Date of Patent: Sep. 24, 2024

(54) SOLID ELECTROLYTIC CAPACITOR CONTAINING A DEOXIDIZED ANODE

(71) Applicant: AVX Corporation, Fountain Inn, SC (US)

(72) Inventors: Masayuki Wakatsuki, Shiga Pref. (JP); Yusuke Sasaki, Shiga. Pref. (JP); Shinpei Etou, Shiga Pref. (JP)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 24 days.

(21) Appl. No.: 17/481,718

(22) Filed: Sep. 22, 2021

(65) Prior Publication Data

US 2022/0093344 A1   Mar. 24, 2022

Related U.S. Application Data

(60) Provisional application No. 63/082,071, filed on Sep. 23, 2020.

(51) Int. Cl.
| | |
|---|---|
| *H01G 9/15* | (2006.01) |
| *H01G 9/00* | (2006.01) |
| *H01G 9/028* | (2006.01) |
| *H01G 9/032* | (2006.01) |
| *H01G 9/052* | (2006.01) |
| *H01G 9/07* | (2006.01) |
| *H01G 9/10* | (2006.01) |
| *H01G 9/04* | (2006.01) |

(52) U.S. Cl.
CPC ............. *H01G 9/15* (2013.01); *H01G 9/0003* (2013.01); *H01G 9/0036* (2013.01); *H01G 9/028* (2013.01); *H01G 9/032* (2013.01); *H01G 9/0525* (2013.01); *H01G 9/07* (2013.01); *H01G 9/10* (2013.01); *H01G 2009/05* (2013.01)

(58) Field of Classification Search
CPC .... H01G 2009/05; H01G 9/10; H01G 9/0525; H01G 9/15; H01G 9/07; H01G 9/032; H01G 9/0036
See application file for complete search history.

(56) References Cited

U.S. PATENT DOCUMENTS

| | | |
|---|---|---|
| 4,945,452 A | 7/1990 | Sturmer et al. |
| 4,960,471 A | 10/1990 | Fife et al. |

(Continued)

FOREIGN PATENT DOCUMENTS

| | | |
|---|---|---|
| JP | S 62277715 A | 12/1987 |
| JP | 2006024669 A | 1/2006 |

(Continued)

OTHER PUBLICATIONS

Paper—Horacek et al., "High CV Tantalum Capacitors—Challenges and Limitations," 11 pages.

(Continued)

*Primary Examiner* — David M Sinclair
(74) *Attorney, Agent, or Firm* — Dority & Manning, P.A.

(57) ABSTRACT

A capacitor that comprises a capacitor element is provided. The capacitor element comprises a deoxidized and sintered anode body that is formed from a powder having a specific charge of about 35,000 μF*V/g or more. Further, a dielectric overlies the anode body and a solid electrolyte overlies the dielectric. The capacitor also exhibits a normalized aged leakage current of about 0.1% or less.

20 Claims, 1 Drawing Sheet

(56) References Cited

U.S. PATENT DOCUMENTS

| | | | |
|---|---|---|---|
| 6,197,252 B1 | 3/2001 | Bishop et al. | |
| 6,432,161 B1 | 8/2002 | Oda et al. | |
| 6,447,570 B1 | 9/2002 | Pozdeev-Freeman | |
| 6,674,635 B1 | 1/2004 | Fife et al. | |
| 6,987,663 B2 | 1/2006 | Merker et al. | |
| 7,066,975 B2 | 6/2006 | Oda et al. | |
| 7,262,511 B2 | 8/2007 | Osako et al. | |
| 7,473,294 B2 | 1/2009 | Oda et al. | |
| 7,731,893 B2 | 6/2010 | Freeman et al. | |
| 8,308,825 B2 | 11/2012 | Freeman et al. | |
| 8,349,030 B1 | 1/2013 | Hussey et al. | |
| 9,548,163 B2 | 1/2017 | Petrzilek et al. | |
| 10,074,484 B2 | 9/2018 | Morioka | |
| 10,121,600 B2 | 11/2018 | Petrzilek et al. | |
| 10,290,429 B2 | 5/2019 | Guerrero et al. | |
| 10,777,362 B2 | 9/2020 | Hussey et al. | |
| 11,120,949 B2 | 9/2021 | Guerrero et al. | |
| 2009/0279233 A1 | 11/2009 | Freeman et al. | |
| 2010/0214723 A1* | 8/2010 | Karnik | H01G 9/15 29/25.03 |
| 2014/0334067 A1* | 11/2014 | Aoki | H01G 9/0525 29/25.03 |
| 2015/0092319 A1* | 4/2015 | Tatsuno | H01G 9/028 361/525 |
| 2016/0079004 A1* | 3/2016 | Freeman | H01G 9/012 29/25.03 |
| 2016/0104580 A1 | 4/2016 | Maeshima et al. | |
| 2018/0144874 A1 | 5/2018 | Yin et al. | |
| 2019/0287730 A1 | 9/2019 | Hussey et al. | |

FOREIGN PATENT DOCUMENTS

| | | |
|---|---|---|
| JP | 2006189163 A | 7/2007 |
| JP | 4366259 B2 | 11/2009 |
| JP | 4648202 B2 | 3/2011 |
| WO | WO 2006/062234 A | 6/2006 |

OTHER PUBLICATIONS

International Search Report and Written Opinion for PCT/US2021/051491 dated Jan. 10, 2022, 12 pages.

* cited by examiner

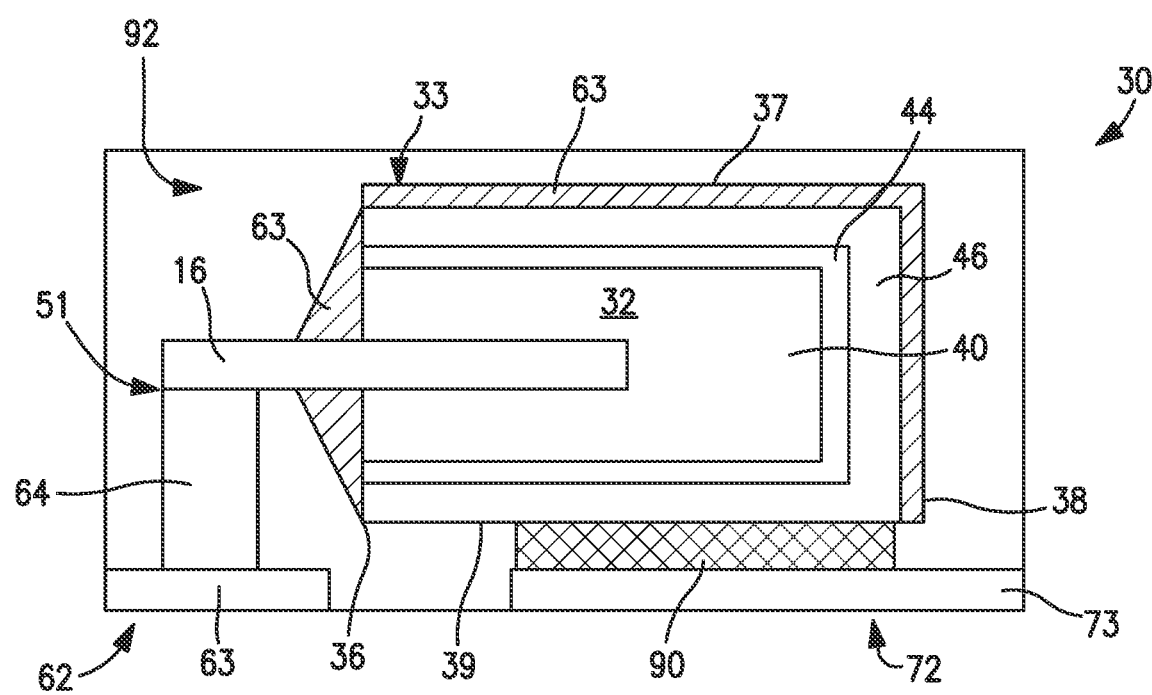

SOLID ELECTROLYTIC CAPACITOR CONTAINING A DEOXIDIZED ANODE

CROSS REFERENCE TO RELATED APPLICATION

The present application claims filing benefit of U.S. Provisional Patent Application Ser. No. 63/082,071 having a filing date of Sep. 23, 2020, which is incorporated herein by reference in its entirety.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Unfortunately, one problem with many solid electrolytic capacitors is that the sintered anode tends to have a relatively low degree of compressive strength when powders having a high specific charge ("CV/g") are employed. This can cause micro-cracks to form in the anode body, which may create potential failure sites in the capacitor under extreme conditions, such as at high temperature and/or high humidity levels. These problems are compounded in that high specific charge powders are generally formed from particles having a very small size and large surface area, which results in the formation of small pores between the particles that are difficult to impregnate with dielectric and solid electrolyte solutions. The difficulty in impregnating such small pores leads to the formation of a solid electrolyte that does not adhere well to the dielectric coating and less likely to achieve good surface coverage, which leads to poor electrical performance of the capacitor. As such, a need currently exists for a solid electrolytic capacitor having an improved performance.

SUMMARY OF THE INVENTION

In accordance with one embodiment of the present invention, a capacitor is disclosed that comprises a capacitor element. The capacitor element comprises a deoxidized and sintered anode body that is formed from a powder having a specific charge of about 35,000 μF*V/g or more. Further, a dielectric overlies the anode body and a solid electrolyte overlies the dielectric. The capacitor also exhibits a normalized aged leakage current of about 0.1% or less as determined according to the following equation:

Normalized Aged Leakage Current=100×(Aged DCL/CV)

wherein,

Aged DCL is the leakage current as measured at a temperature of about 23° C. and at a rated voltage for about 60 seconds after the capacitor is subjected to life testing at a temperature of 85° C. and the rated voltage for 120 hours and then allowed to recover for 60 minutes at a temperature of about 23° C.;

C is initial capacitance (Farads) as determined at a temperature of about 23° C. and an operating frequency of 120 Hz; and V is the rated voltage (volts).

In accordance with another embodiment of the present invention, a method for forming a solid electrolytic capacitor is disclosed. The method comprises forming an anode by a process that includes compacting a powder having a specific charge of about 35,000 μF*V/g or more into a porous anode body, subjecting the porous anode body to a deoxidation process to form a deoxidized anode body, and sintering the deoxidized anode body. Further, the deoxidized and sintered anode body is anodically oxidized to form a dielectric that overlies the anode body, and a solid electrolyte is formed that overlies the dielectric.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a cross-sectional view of one embodiment of a capacitor of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor that is capable of exhibiting good electrical properties under a wide variety of different conditions. More particularly, the capacitor contains a capacitor element that includes a sintered porous anode body and a dielectric that overlies the anode body. The anode body is formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder has a relatively high specific charge, such as about 35,000 μF*V/g or more, in some embodiments about 50,000 μF*V/g or more, in some embodiments from about 70,000 to about 350,000 μF*V/g, in some embodiments from about 80,000 to about 325,000 μF*V/g, and in some embodiments, from about 100,000 to about 300,000 μF*V/g. As is known in the art, the specific charge may be determined by multiplying capacitance by the anodizing voltage employed, and then dividing this product by the weight of the anodized electrode body.

During formation of the capacitor, the anode body is compacted and thereafter subjected to deoxidation to minimize the presence of oxygen in the interior of the anode body. The resulting anode body may thus have a relatively low oxygen content. For example, the anode body may have no more than about 5,500 ppm oxygen, in some embodiments no more than about 5,000 ppm oxygen, and in some embodiments, from about 500 to about 4,500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

The present inventors have discovered that through selective control over the specific aspects of the deoxidation process, the resulting capacitor may have having a unique and beneficial array of properties. For example, the sintered anode body may exhibit a high degree of compressive strength, such as about 1 kilogram-force ("$kg_f$") or more, in some embodiments about 5 $kg_f$ or more, and in some embodiments, from about 10 to about 100 $kg_f$. Among other things, the high degree of compressive strength can help limit the formation of micro-cracks in the anode body, which results in better electrical performance of the capacitor under a wide variety of extreme conditions, such as at high temperatures and/or humidity levels. Minimizing the oxygen content using the specific deoxidation process described herein can also enhance the degree of penetration of the dielectric and solid electrolyte, thereby further improving electrical performance.

The capacitor may, for instance, exhibit a low leakage current ("DCL") under a variety of conditions. More particularly, the capacitor may exhibit a DCL of only about 20 microamps ("$\mu A$") or less, in some embodiments about 10 $\mu A$ or less, in some embodiments about 5 $\mu A$ or less, in some embodiments about 1 $\mu A$ or less, in some embodiments from about 0.5 $\mu A$ or less, and in some embodiments, from about 0.01 to about 0.3 $\mu A$ at a temperature of about 23° C. after being subjected to an applied voltage (e.g., rated voltage or a multiple of the rated voltage, such as 1.1× rated voltage) for a period of time from about 5 seconds to about 500 seconds, and in some embodiments, from 20 seconds to about 400 seconds (e.g., 60 seconds or 300 seconds). Of course, the absolute value of the DCL may be depend on certain aspects of the capacitor, including the specific charge of the powder, the size of the capacitor element, etc. In this regard, a normalized DCL may be determined as a percentage of the nominal charge by the following equation:

$$\text{Normalized } DCL=100\times(DCL/CV)$$

wherein, C is the initial capacitance (Farad) and V is the rated voltage (volts).

The capacitor of the present invention may, for instance, exhibit a normalized DCL of about 0.5% or less, in some embodiments about 0.2% or less, in some embodiments about 0.1% or less, in some embodiments about 0.09% or less, in some embodiments about 0.08% or less, and in some embodiments, from about 0.01% to about 0.07%, as determined at a temperature of about 23° C. after being subjected to an applied voltage (e.g., rated voltage or a multiple of the rated voltage, such as 1.1× rated voltage) for a period of time from about 5 seconds to about 500 seconds, and in some embodiments, from 20 seconds to about 400 seconds (e.g., 60 seconds or 300 seconds).

Notably, the low DCL values can still remain stable even at high temperatures. For example, the capacitor may exhibit an "aged" DCL value within the ranges noted above even after being exposed to life testing at a temperature of from about 80° C. or more, and in some embodiments, from about 85° C. to about 150° C. (e.g., about 85° C., 105° C., 125° C., or 150° C.) for a substantial period of time, such as for about 50 hours or more, in some embodiments from about 100 hours to about 3,000 hours, and in some embodiments, from about 120 hours to about 2,500 hours (e.g., 120, 250, 500, 750, or 1,000 hours). In one embodiment, for example, the aged DCL of the capacitor after being exposed to life testing at a high temperature (e.g., about 85° C.) for 120 hours after recovery at room temperature (e.g., about 23° C.) for 60 minutes may be about 0.5 $\mu A$ or less, in some embodiments about 0.3 $\mu A$ or less, in some embodiments about 0.25 $\mu A$ or less, and in some embodiments, in some embodiments about 0.2 $\mu A$ or less, and in some embodiments, from about 0.01 to about 0.1 $\mu A$. Likewise, the ratio of the aged DCL of the capacitor after being exposed to a high temperature (e.g., about 85° C.) for 120 hours after recovery at room temperature (e.g., about 23° C.) for 60 minutes to the initial DCL of the capacitor (e.g., at about 23° C.) may be about 5 or less, in some embodiments about 3 or less, in some embodiments about 2 or less, in some embodiments about 1.5 or less, and in some embodiments, from about 0.6 to about 1.2. Further, the normalized aged DCL of the capacitor may be determined as a percentage of the nominal charge by the following equation:

$$\text{Normalized Aged } DCL=100\times(\text{Aged } DCL/CV)$$

wherein, Aged DCL is the leakage current after being exposed to life testing at 85° C. for 120 hours and after recovery for 60 minutes at room temperature (about 23° C.), C is the initial capacitance (Farad) and V is the rated voltage (volts).

The Normalized Aged DCL may be about 0.1% or less, in some embodiments about 0.075% or less, in some embodiments about 0.07% or less, in some embodiments about 0.065% or less, in some embodiments about 0.06% or less, and in some embodiments, from about 0.001 to about 0.006%. Likewise, the ratio of the normalized aged DCL of the capacitor after being exposed to a high temperature (e.g., about 85° C.) for 120 hours after recovery for 60 minutes to the initial normalized aged DCL of the capacitor (e.g., at about 23° C.) may also be about 5 or less, in some embodiments about 3 or less, in some embodiments about 2 or less, in some embodiments about 1.5 or less, and in some embodiments, from about 0.6 to about 1.2.

Other electrical properties of the capacitor may also be good and remain stable under various conditions. For example, the capacitor may exhibit a relatively low equivalence series resistance ("ESR"), such as about 200 mohms, in some embodiments less than about 150 mohms, in some embodiments from about 0.01 to about 125 mohms, and in some embodiments, from about 0.1 to about 100 mohms, measured at an operating frequency of 100 kHz and temperature of 23° C. The capacitor may also exhibit such ESR values even after being exposed to a temperature of from about 80° C. or more, in some embodiments from about 100° C. to about 150° C., and in some embodiments, from about 105° C. to about 130° C. (e.g., 105° C. or 125° C.) for a substantial period of time, such as for about 100 hours or more, and in some embodiments, from about 150 hours to about 3,000 hours (e.g., 3,000 hours). In one embodiment, for example, the ratio of the ESR of the capacitor after being exposed to the high temperature (e.g., 105° C.) for 3,000 hours to the initial ESR value of the capacitor (e.g., at 23° C.) is about 2.0 or less, in some embodiments about 1.5 or less, and in some embodiments, from 1.0 to about 1.3. Further, the ratio of the capacitance after being subjected to repeated cycles of a surge voltage ("charge-discharge capacitance") to the initial capacitance value prior to such testing may be from about 0.7 to 1, in some embodiments from about 0.8 to 1, in some embodiments from about 0.9 to 1, and in some embodiments, from 0.91 to 0.99. The surge voltage may be applied for 4,000 to 16,000 cycles (e.g., 4,000, 8,000, 12,000, or 16,000 cycles). In addition, the capacitance may also remain stable even after being exposed to a high temperature, such as from about 80° C. or more, in some embodiments from about 100° C. to about 150° C., and in some embodiments, from about 105° C. to about 130° C. (e.g., 105° C. or 125° C.) for a substantial period of time, such as for about 100 hours or more, and in some embodiments, from about 150 hours to about 3,000 hours (e.g., 3,000 hours). In one embodiment, for example, the ratio of the capacitance after being exposed to the high temperature (e.g., 105° C.) for 3,000 hours to the initial capacitance value (e.g., at 23° C.) is from about 0.7 to 1, in some embodiments from about 0.8 to 1, in some embodiments from about 0.9 to 1, and in some embodiments, from 0.91 to 0.99. The actual capacitance value (dry) may vary, but is typically about 1 milliFarad per square centimeter ("mF/cm$^2$") or more, in some embodiments about 2 mF/cm$^2$ or more, in some embodiments from about 5 to about 50 mF/cm$^2$, and in some embodiments, from about 8 to about 20 mF/cm$^2$, measured at a frequency of 120 Hz.

The capacitor may also exhibit a high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor may exhibit a wet-to-dry capacitance percentage of about 50% or more, in some embodiments about 60% or more, in some embodiments about 70% or more, and in some embodiments, from about 80% to 100%.

It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor is typically about 250% or less, in some embodiments about 200% or less, and in some embodiments, from about 1% to about 180%, as determined at a frequency of 120 Hz. The capacitor may also be able to be employed in high voltage applications, such as at rated voltages of about 35 volts or more, in some embodiments about 50 volts or more, and in some embodiments, from about 60 volts to about 200 volts. The capacitor may, for example, exhibit a relatively high "breakdown voltage" (voltage at which the capacitor fails), such as about 60 volts or more, in some embodiments about 70 volts or more, in some embodiments about 80 volts or more, and in some embodiments, from about 100 volts to about 300 volts. Likewise, the capacitor may also be able to withstand relatively high surge currents, which is also common in high voltage applications. The peak surge current may be, for example, about 100 Amps or more, in some embodiments about 200 Amps or more, and in some embodiments, and in some embodiments, from about 300 Amps to about 800 Amps.

Various embodiments of the invention will now be described in more detail.

I. Capacitor Element

A. Anode Body

As noted above, the anode body is formed from a powder that contains a valve metal or valve metal-based compound. In one embodiment, for instance, the powder is formed from tantalum. If desired, a reduction process may be employed in which a tantalum salt (e.g., potassium fluorotantalate (K$_2$TaF$_7$), sodium fluorotantalate (Na$_2$TaF$_7$), tantalum pentachloride (TaCl$_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., TaCl$_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The powder may be a free-flowing, finely divided powder that contains primary particles. The primary particles of the powder generally have a median size (D50) of from about 5 to about 250 nanometers, in some embodiments from about 10 to about 200 nanometers, and in some embodiments, from about 20 to about 150 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc. If desired, the powder may also be doped with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to agglomeration. The powder may also be subjected to one or more deoxidation treatments. For example, the powder may be exposed to a getter material (e.g., magnesium), such as described in U.S. Pat. No. 4,960,471. The temperature at which deoxidation of the powder occurs may vary, but typically ranges from about 700° C. to about 1,600° C., in some embodiments from about 750° C. to about 1,200° C., and in some embodiments, from about 800° C. to about 1,000° C. The total time of the deoxidation treatment(s) may range from about 20 minutes to about 3 hours.

The resulting powder has certain characteristics that enhance its ability to be formed into a capacitor anode. For example, the powder typically has a specific surface area of from about 0.5 to about 10.0 m$^2$/g, in some embodiments from about 0.7 to about 5.0 m$^2$/g, and in some embodiments, from about 2.0 to about 4.0 m$^2$/g. Likewise, the bulk density of the powder may be from about 0.1 to about 0.8 grams per cubic centimeter (g/cm$^3$), in some embodiments from about 0.2 to about 0.6 g/cm$^3$, and in some embodiments, from about 0.4 to about 0.6 g/cm$^3$.

Once the powder is formed, it is then generally compacted or pressed to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder is typically pressed to a density of from about 0.5 to about 20 g/cm$^3$, in some embodiments from about 1 to about 15 g/cm$^3$, and in some embodiments, from about 2 to about 10 g/cm$^3$. The powder may be compacted around an anode lead, which may be in the form of a wire, sheet, etc. Alternatively, the lead may simply be connected to a surface of the anode body after it is formed. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering). Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197, 252 to Bishop, et al.

After binder removal, the anode body may be subjected to a deoxidation process. In one embodiment, for example, the deoxidation process includes exposing the anode body to a getter material (e.g., magnesium, titanium, etc.) that is capable of removing oxygen from the anode body by chemical reaction, adsorption, etc. More particularly, the anode body is initially inserted into an enclosure (e.g., tantalum box) that also contains the getter material. The atmosphere within the enclosure is typically an inert atmosphere (e.g., argon gas). To initiate the deoxidation, the atmosphere within the enclosure is heated to a temperature that is sufficient to melt and/or vaporize the getter material and deoxidize the anode body. The temperature may vary depending on the specific charge of the anode powder, but typically ranges from about 700° C. to about 1,200° C., in some embodiments from about 750° C. to about 1,100° C., and in some embodiments, from about 800° C. to about 1,000° C. The total time of deoxidation may range from about 20 minutes to about 3 hours. This may occur in one or more steps. Upon completion of the deoxidation, the getter material typically vaporizes and forms a precipitate on a wall of the enclosure. To ensure removal of the getter material, the anode body may also be subjected to one or more acid leaching steps, such as with a solution of nitric acid, hydrofluoric acid, hydrogen peroxide, sulfuric acid, water, etc., or a combination thereof.

After deoxidation, the anode body may be sintered to form a porous, integral mass. The anode body is typically sintered at a temperature of from about 700° C. to about 1,600° C., in some embodiments from about 800° C. to about 1,500° C., and in some embodiments, from about 900° C. to about 1,200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. As noted above, sintering of the anode body generally occurs after deoxidation. It should be understood, however, that the anode body may also be subjected to one or more pre-sintering steps prior to oxidation to help provide the desired degree of green strength for the deoxidation process. Such pre-sintering steps may be conducted under the same or different conditions as the sintering process that occurs after deoxidation. For example, pre-sintering may occur in one or more steps at a temperature of from about 700° C. to about 1,600° C., in some embodiments from about 800° C. to about 1,500° C., and in some embodiments, from about 900° C. to about 1,200° C., for a time of from about 5 minutes to about 100 minutes, and in some embodiments, from about 8 minutes to about 15 minutes. Pre-sintering may also occur in a reducing atmosphere, such as in a vacuum, inert gas, hydrogen, etc., as described above.

B. Dielectric

The anode body is coated with a dielectric. The dielectric may be formed by anodically oxidizing ("anodizing") the sintered anode body so that a dielectric layer is formed over and/or within the anode body. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current may be passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The forming voltage employed during anodization is generally about 20 volts or more, in some embodiments about 30 volts or more, in some embodiments about 35 volts or more, and in some embodiments, from about 35 to about 70 volts, and at temperatures ranging from about 10° C. or more, in some embodiments from about 20° C. to about 200° C., and in some embodiments, from about 30° C. to about 100° C. The resulting dielectric layer may be formed on a surface of the anode and within its pores.

By selectively controlling the particular manner in which the anode body is formed, the present inventors have discovered that the resulting capacitor can exhibit a high degree of dielectric strength, which can improve capacitance stability. The "dielectric strength" generally refers to the ratio of the "breakdown voltage" of the capacitor (voltage at which the capacitor fails in volts, "V") to the thickness of the dielectric (in nanometers, "nm"). The capacitor typically exhibits a dielectric strength of about 0.4 V/nm or more, in some embodiments about 0.45 V/nm or more, in some embodiments about 0.5 V/nm or more, in some embodiments from about 0.55 to about 1 V/nm, and in some embodiments, from about 0.6 to about 0.9 V/nm. The capacitor may, for example, exhibit a relatively high breakdown voltage, such as about 30 volts or more, in some embodiments about 35 volts or more, in some embodiments about 50 volts or more, in some embodiments about 65 volts or more, in some embodiments about 85 volts or more, in some embodiments about 90 volts or more, in some embodiments about 95 volts or more, and in some embodiments, from about 100 volts to about 300 volts, such as determined by increasing the applied voltage in increments of 3 volts until the leakage current reaches 1 mA. While its thickness can generally vary depending on the particular location of the anode body, the "dielectric thickness" for purposes of determining dielectric strength is generally considered as the greatest thickness of the dielectric, which typically ranges from about 50 to about 500 nm, in some embodiments from about 80 to about 350 nm, and in some embodiments, from about 100 to about 300 nm. The dielectric thickness may be measured using Zeiss Sigma FESEM at 20,000× to 50,000× magnification, wherein the sample is prepared by cutting a finished part in plane perpendicular to the longest dimension of the finished part, and the thickness is measured at sites where the cut is perpendicular through the dielectric layer.

C. Solid Electrolyte

A solid electrolyte overlies the dielectric. The total thickness of the solid electrolyte is typically from about 1 to about 50 µm, and in some embodiments, from about 5 to about 20 µm. The solid electrolyte may contain one or more layers of a conductive inorganic oxide (e.g., manganese dioxide), conductive polymer (e.g., polyheterocycles, such as polypyrroles, polythiophenes, polyanilines, etc., polyacetylenes, poly-p-phenylenes, polyphenolates, etc.), and so forth. In one embodiment, for example, the solid electrolyte may include a manganese dioxide. As is known in the art, manganese dioxide may be formed by the pyrolytic decomposition of manganese nitrate ($Mn(NO_3)_2$), such as described in U.S. Pat. No. 4,945,452 to Sturmer, et al. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. The time for the conversion depends on the furnace temperature, heat transfer rate and atmosphere, but generally is from about 3 to about 5 minutes. After pyrolysis, the leakage current may sometimes be increased due to damage suffered by the dielectric film during the deposition of the manganese dioxide. To help further reduce this leakage, the capacitor may be reformed in an anodization bath as is known in the art. For example, the capacitor may be dipped into an electrolyte such as described above and then subjected to a DC current.

D. Moisture Barrier Layer

If desired, a moisture barrier layer may be employed overlies the solid electrolyte. The moisture barrier layer may be formed from a variety of different materials, such as a hydrophobic elastomer, e.g., silicones, fluoropolymers, etc. Silicone polymers are particularly suitable for use in the moisture barrier layer of the present invention. Such elastomers are typically derived from polyorganosiloxanes, such as those having the following general formula:

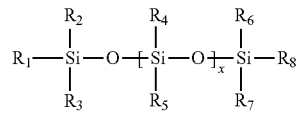

wherein, x is an integer greater than 1; and $R_1$, $R_2$, $R_3$, $R_4$, $R_5$, $R_6$, $R_7$, and $R_8$ are independently monovalent groups typically containing from 1 to about 20 carbon atoms, such as alkyl groups (e.g., methyl, ethyl, propyl, pentyl, octyl, undecyl, octadecyl, etc.); alkoxy groups (e.g., methoxy, ethoxy, propoxy, etc.); carboxyalkyl groups (e.g., acetyl); cycloalkyl groups (e.g., cyclohexyl); alkenyl groups (e.g., vinyl, allyl, butenyl, hexenyl, etc.); aryl groups (e.g., phenyl, tolyl, xylyl, benzyl, 2-phenylethyl, etc.); and halogenated hydrocarbon groups (e.g., 3,3,3-trifluoropropyl, 3-chloropropyl, dichlorophenyl, etc.). Examples of such polyorganosiloxanes may include, for instance, polydimethylsiloxane ("PDMS"), polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, etc. To form an elastomer, the polyorganosiloxane may be crosslinked using any of a variety of known techniques, such as by catalyst curing (e.g., platinum catalysts), room temperature vulcanization, moisture curing, etc. Crosslinking agents may be employed, such as alkoxy silanes having the formula Si—OR, wherein R is H, alkyl (e.g., methyl), alkenyl, carboxyalkyl (e.g., acetyl), and so forth.

In addition to being hydrophobic, it is generally desired that the material used to form the moisture barrier layer has a relatively low modulus and a certain degree of flexibility, which can help absorb some of the thermal stresses caused by expansion of the casing and also allow it to be subjected to compressive forces. The flexibility of the material may be characterized by a corresponding low modulus of elasticity ("Young's modulus"), such as about 5,000 kilopascals ("kPa") or less, in some embodiments from about 1 to about 2,000 kPa, and in some embodiments, from about 2 to about 500 kPa, measured at a temperature of about 25° C. The material also typically possesses a certain degree of strength that allows it to retain its shape even when subjected to compressive forces. For example, the material may possess a tensile strength of from about 1 to about 5,000 kPa, in some embodiments from about 10 to about 2,000 kPa, and in some embodiments, from about 50 to about 1,000 kPa, measured at a temperature of about 25° C. With the conditions noted above, the hydrophobic elastomer can even further enhance the ability of the capacitor to function under extreme conditions.

To help achieve the desired flexibility and strength properties, a non-conductive filler may be employed in the moisture barrier layer. When employed, such additives typically constitute from about 0.5 wt. % to about 30 wt. %, in some embodiments from about 1 wt. % to about 25 wt. %, and in some embodiments, from about 2 wt. % to about 20 wt. % of the moisture barrier layer. The silicone elastomer may constitute from about 70 wt. % to about 99.5 wt. %, in some embodiments from about 75 wt. % to about 99 wt. %, and in some embodiments, from about 80 wt. % to about 98 wt. % of the moisture barrier layer. One particular example of such a filler includes, for instance, silica. While most forms of silica contain a relatively hydrophilic surface due to the presence of silanol groups (Si—OH), the silica may optionally be surface treated so that its surface contains $(CH_3)_n$—Si— groups, wherein n is an integer of 1 to 3, which further enhances the hydrophobicity of the moisture barrier layer. The surface treatment agent may, for example, be an organosilicon compound monomer having a hydrolyzable group or a partial hydrolyzate thereof. Examples of such compounds may include organosilazanes, silane coupling agents such as described above, etc.

The moisture barrier layer may be applied to any surface of the capacitor to provide the desired properties. For example, the moisture barrier layer may be located on the top, bottom, and/or side surfaces of the capacitor. The moisture barrier layer may likewise be located on the front and/or rear surface of the capacitor. The moisture barrier layer may cover the entire area or only a portion of the area of the surface to which it is applied. In one embodiment, for example, the moisture barrier layer covers about 30% or more, in some embodiments about 40% or more, and in some embodiments, about 50% or more of a surface of the capacitor to which it is applied.

Referring to FIG. 1, for example, one embodiment of a capacitor 30 is shown that contains a capacitor element 33 having a generally rectangular shape and contains a front surface 36, rear surface 38, top surface 37, bottom surface 39, first side surface 32, and second side surface (not shown). In the illustrated embodiment, an anode lead 16 is embedded within an anode body 40 and extends from the front surface 36 of the capacitor element 33 in a longitudinal direction. Alternatively, the anode lead 16 may simply be connected (e.g., welded) to the front surface 36 of the capacitor element 33. The capacitor element 33 contains a dielectric (not shown) that overlies the anode body 40, solid electrolyte 44 that overlies that dielectric, and cathode coating 46 that overlies the solid electrolyte 44. As shown, the solid electrolyte 44 and cathode coating 46 are typically present at each surface of the capacitor 30 except for the front surface 36. Of course, it should be understood that such layers may be applied to any surface of the capacitor, and need not be applied in the manner illustrated.

The capacitor element 33 also contains an optional moisture barrier layer 63 that includes a hydrophobic material. In this particular embodiment, the moisture barrier layer 63 overlies the solid electrolyte 44 at the rear surface 38, top surface 37, as well as the side surfaces (not shown). The moisture barrier layer 63 is also present at the front surface 36, although it may not necessarily overly the solid electrolyte at this surface as noted above. Of course, it should be understood that the moisture barrier layer 63 need not be located on the surfaces of the capacitor element 33 as shown in FIG. 1. In another embodiment, for example, the moisture barrier layer may be located only at the side surfaces of the capacitor element 33. Regardless of the where it is located, the moisture barrier layer may cover any desired portion of the surface. For example, the moisture barrier layer may cover substantially all of the surfaces on which they are located, such as about 90% or more, and in some embodiments, about 95% or more. Once again, however, this is merely optional and the layer need not cover such a substantial portion of the surface.

E. Other Optional Components

If desired, the capacitor element may also contain other layers as is known in the art. For example, an adhesive layer may optionally be formed between the dielectric and solid electrolyte. The adhesive layer is typically formed from a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other adhesive layer materials are described in more detail U.S. Pat. No. 6,674, 635 to Fife, et al.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Terminations

Once formed, the capacitor element may be provided with terminations, particularly when employed in surface mounting applications. For example, the capacitor may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and compound (e.g., silane compounds). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

Referring again to FIG. 1, for example, the electrolytic capacitor 30 is shown as including an anode termination 62 and a cathode termination 72 in electrical connection with the capacitor element 33. Although it may be in electrical contact with any of the surfaces of the capacitor element 33, the cathode termination 72 in the illustrated embodiment is in electrical contact with the lower surface 39 via a conductive adhesive 90. More specifically, the cathode termination 72 contains a first component 73 that is in electrical contact and generally parallel with the lower surface 39 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive 90 may initially be applied to a surface of the cathode termination 72. The conductive adhesive 90 may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive 90 and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casing

The capacitor element is generally encapsulated within a casing so that at least a portion of the anode and cathode terminations are exposed for mounting onto a circuit board. As shown in FIG. 1, for instance, the capacitor element 33 is encapsulated within a casing 92 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

The present invention may be better understood by reference to the following examples.

Test Procedures

Breakdown Voltage

The breakdown voltage was measured using Keithley 2400 SourceMeter at the temperature 23° C.±2° C. An individual capacitor is charged with constant current determined by the equation:

Current (A)=Nominal Capacitance (F)×$dU/dt$, where $dU/dt$ represents voltage slope typically set to 10 V/s. Voltage is measured during charging and when applied voltage decreases more than 10%, the maximum achieved voltage value is recorded as breakdown voltage.

Equivalent Series Resistance (ESR)

Equivalence series resistance may be measured using a HP4284A LCR meter with Kelvin Leads with 0 volt DC bias and 10 mVAC signals. The operating frequency was 100 kHz and the temperature was 23° C.±2° C.

Dissipation Factor

The dissipation factor may be measured using a LCZHP4284A LCR meter with Kelvin Leads with 0 volt DC bias and 10 mVAC signals. The operating frequency may be 120 Hz and the temperature may be 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature may be 23° C. t 2° C.

Leakage Current

Leakage current may be measured using a leakage test meter (YHP4140B) at a temperature of 23° C.±2° C., with 1 kOhm resistor to limit charging current and at the rated voltage after a minimum of 60 seconds (e.g., 60 seconds or 300 seconds).

Life Testing

Life testing may be conducted at a temperature of 85° C. and at a multiple of 1.0× the rated voltage for a time period of 500 hours. The size of the test group is typically 12 samples. During and after life testing, the aged samples may be allowed recover at room temperature for about 60 minutes. The "recovered" DCL may then be measured at a temperature of 23° C.±2° C. at the rated voltage for about 60 seconds. The period for intermediate "recovered" DCL measurement is typically 120 hours.

Example 1

100,000 µFV/g tantalum powder was used to form anode samples. Each anode sample was pressed to a density of 6.0 g/cm$^3$ and sintered at 1275° C. Sintering was followed by deoxidation process at 860° C., welding a lead wire, and a second sintering process conducted at 1275° C. The resulting pellets had a size of 1.19×1.68×0.95 mm. The pellets were anodized to 36.8 volts in water/nitric acid electrolyte with a conductivity of 7.3 mS at a temperature of 85° C. to form the dielectric layer. The anodes were then dipped into an aqueous solution of manganese(II) nitrate (1190 kg/m$^3$) for 180 seconds and then decomposed at 250° C. This step was repeated nine times. Thereafter, anodes were dipped into an aqueous solution of manganese(II) nitrate (1300 kg/m$^3$) and then decomposed at 250° C. to achieve an $MnO_2$ cathode. Finally, the anodes were then dipped sequentially into a graphite dispersion and in a silver dispersion and dried. The finished capacitor elements were completed by conventional assembly technology. Multiple parts (500) of 22 µF/16V capacitors were made in this manner.

Example 2

Capacitors were formed in the manner described in Example 1, except that the first sintering process was skipped and the deoxidation process temperature was 960° C. Multiple parts (500) of 22 µF/16V capacitors were made in this manner.

Example 3

Capacitors were formed in the manner described in Example 2, except that 150,000 µFV/g tantalum powder was used. The pellets were anodized to 40 volts. Multiple parts (500) of 22 µF/16V capacitors were made in this manner.

Example 4

Capacitors were formed in the manner described in Example 2, except that 200,000 µFV/g tantalum powder was used and the anodes were sintered at 1225° C. The pellets were anodized to 40 volts. Multiple parts (500) of 22 µF/16V capacitors were made in this manner.

The average leakage current properties of finished capacitors and after life testing were measured. The results are set forth below.

TABLE 1

DCL of Finished Capacitors

|  | DCL Average (µA) | Normalized DCL (%) |
| --- | --- | --- |
| Example 1 | 0.332 | 0.094 |
| Example 2 | 0.280 | 0.080 |
| Example 3 | 0.224 | 0.064 |
| Example 4 | 0.255 | 0.072 |

TABLE 2

DCL After Life Testing

|  | Time (hours) | Recovered DCL (µA) | Normalized Aged DCL (%) |
| --- | --- | --- | --- |
| Example 1 | 0 | 0.314 | 0.089 |
|  | 120 | 0.276 | 0.079 |
|  | 500 | 1.539 | 0.437 |
| Example 2 | 0 | 0.237 | 0.067 |
|  | 120 | 0.251 | 0.071 |
|  | 500 | 2.401 | 0.682 |
| Example 3 | 0 | 0.186 | 0.053 |
|  | 120 | 0.096 | 0.027 |
|  | 500 | 1.706 | 0.485 |
| Example 4 | 0 | 0.250 | 0.071 |
|  | 120 | 0.188 | 0.054 |
|  | 500 | 0.173 | 0.049 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising a capacitor element, the capacitor element comprising a deoxidized and sintered anode body that is formed from a tantalum powder having a specific charge of about 100,000 to about 350,000 µF*V/g, a dielectric which includes tantalum pentoxide and that is formed at a forming voltage of about 35 volts or more that overlies the anode body, and a solid electrolyte that overlies the dielectric, wherein the capacitor exhibits a dielectric strength of about 0.4 V/nm or more and an Aged DCL of about 0.5 µA or less and a normalized aged leakage current of about 0.075% or less as determined according to the following equation:

Normalized Aged Leakage Current=100×(Aged DCL/CV)

wherein,
Aged DCL is the leakage current as measured at a temperature of about 23° C. and at a rated voltage for about 60 seconds after the capacitor is subjected to life testing at a temperature of 85° C. and the rated voltage for 120 hours and then allowed to recover for 60 minutes at a temperature of about 23° C.;
C is initial capacitance (Farads) as determined at a temperature of about 23° C. and an operating frequency of 120 Hz; and
V is the rated voltage (volts).

2. The solid electrolytic capacitor of claim 1, wherein the Aged DCL is about 25 µA or less.

3. The solid electrolytic capacitor of claim 1, wherein the solid includes manganese dioxide.

4. The solid electrolytic capacitor of claim 1, further comprising:
an anode termination that is in electrical connection with the anode body;
a cathode termination that is in electrical connection with the solid electrolyte; and
a housing that encloses the capacitor element and leaves exposed at least a portion of the anode termination and the cathode termination.

5. The solid electrolytic capacitor of claim 4, wherein the housing is formed from a resinous material that encapsulates the capacitor element.

6. The solid electrolytic capacitor of claim 1, wherein the powder has a specific charge of from about 100,000 to about 300,000 µF*V/g.

7. The solid electrolytic capacitor of claim 1, wherein a moisture barrier layer overlies the solid electrolyte.

8. The solid electrolytic capacitor of claim 1, wherein there is no pre-sintering step prior to deoxidation.

9. The solid electrolytic capacitor of claim 1, wherein the deoxidized and sintered anode body exhibits a degree of compressive strength of about 1 kilogram-force ("kg/") or more.

10. A method for forming a solid electrolytic capacitor, the method comprising:
forming an anode by a process that includes compacting a powder which includes tantalum having a specific charge of about 100,000 to about 350,000 µF*V/g into a porous anode body, subjecting the porous anode body to a deoxidation process to form a deoxidized anode body, sintering the deoxidized anode body;
anodically oxidizing the deoxidized and sintered anode body at a forming voltage of about 35 volts or more to form a dielectric which includes tantalum pentoxide that overlies the anode body; and
forming a solid electrolyte that overlies the dielectric;
wherein the capacitor exhibits a dielectric strength of about 0.4 V/nm or more and an Aged DCL of about 0.5 µA or less and a normalized aged leakage current of about 0.075% or less as determined according to the following equation:

Normalized Aged Leakage Current=100×(Aged DCL/CV)

wherein,
Aged DCL is the leakage current as measured at a temperature of about 23° C. and at a rated voltage for about 60 seconds after the capacitor is subjected to life testing at a temperature of 85° C. and the rated voltage for 120 hours and then allowed to recover for 60 minutes at a temperature of about 23° C.;
C is initial capacitance (Farads) as determined at a temperature of about 23° C. and an operating frequency of 120 Hz; and
V is the rated voltage (volts).

11. The method of claim 10, wherein an anode lead wire is connected to the porous anode body.

12. The method of claim 10, wherein the deoxidization process includes inserting the porous anode body into an enclosure that contains a getter material.

13. The method of claim 12, further comprising heating an atmosphere of the enclosure to a temperature of from about 700° ° C. to about 1,200° C.

14. The method of claim 10, wherein sintering occurs at a temperature of from about 700° C. to about 1,600° C.

15. The method of claim 10, further comprising pre-sintering the porous anode body prior to the deoxidation process.

16. The method of claim 10, wherein the Aged DCL is about 0.25 µA or less.

17. The method of claim 10, wherein the powder has a specific charge of from about 100,000 to about 300,000 µF*V/g.

18. The method of claim 10, wherein the solid electrolyte includes manganese dioxide.

19. The method of claim 10, further comprising forming a moisture barrier layer that overlies the solid electrolyte.

20. The method of claim 10, further comprising no pre-sintering step prior to deoxidation.

\* \* \* \* \*